INVENTORS
HAROLD MOREINES
HUGH D. STEWART
ATTORNEY

INVENTORS
HAROLD MOREINES
HUGH D. STEWART
ATTORNEY

United States Patent Office 3,199,006
Patented Aug. 3, 1965

3,199,006
SWITCHING LOGIC MEANS FOR A DISCRETE SERVOMOTOR MECHANISM
Harold Moreines, Springfield, and Hugh D. Stewart, Westwood, N.J., assignors to The Bendix Corporation, Teterboro, N.J., a corporation of Delaware
Filed Jan. 23, 1963, Ser. No. 253,302
2 Claims. (Cl. 318—33)

This invention relates to improvements in a switching logic means for a discrete servomotor mechanism capable of accepting parallel digital commands of an arbitrary number of bits and more particularly to a novel means for controlling the positioning of a load or shaft to multiple discrete positions and to novel means for data comparison which permits implementation of the switching logic with a minimum number of information tracks.

An object of the invention is to provide novel means to obtain discrete servo position data from a code drum having a set of brush contacts.

Another object of the invention is to provide a novel discrete servomotor mechanism whereby possible command servo positions may be effected which are not contiguous but which positions are separated by guard zones which are inadmissible as steady-state servo positions.

Another object of the invention is to provide a novel code drum operably connected so that three binary digits may effect eight discrete positions of the code drum, the extreme position being designated, the zero position (corresponding to the binary command of 000), and the eighth position (corresponding to the binary number of 111) and in which arrangement of the code drum, angular adjustment thereof beyond the extreme positions is limited by electrical stops so provided as to prevent overtravel of the control brushes cooperating therewith.

Another object of the invention is to provide a novel code drum so arranged that corresponding to the eight number commands are eight adjoining zones and centered within each zone is the commanded station or discrete position having an angular width corresponding to the desired positioning accuracy.

Another object of the invention is to provide novel switch logic means operated sequentially starting with the most significant motor command to drive the servo mechanism in the proper direction until the most significant digit command is satisfied.

Another object of the invention is to provide novel driving means for such coded drum so arranged as to be automatically switched so as to continue to drive the code drum in the proper direction until a selected most significant digit command is satisfied and which operation is continued for each less significant digit command so that they are satisfied by a servo positioning of the coded drum within the proper numbered zone.

Another object of the invention is to provide novel driving means for such a coded drum so arranged as to position the servomechanism to the station corresponding to the numbered zone and in which there is provided novel switching logic means to perform such function by automatically determining in what zone the present position lies and in continuing to drive in the proper direction so as to drive the servomechanism in the proper direction to the selective station and in which arrangement when the servomechanism has reached the commanded position within the station width, all motive powers are removed and braking means are applied so as to stop the servomechanism within the desired tolerances.

These and other objects and features of the invention are pointed out in the following description in terms of the embodiment thereof which is shown in the accompanying drawings. It is to be understood, however, that the drawings are for the purpose of illustration only and are not a definition of the limits of the invention, reference being had to the appended claims for this purpose.

Figure 1:
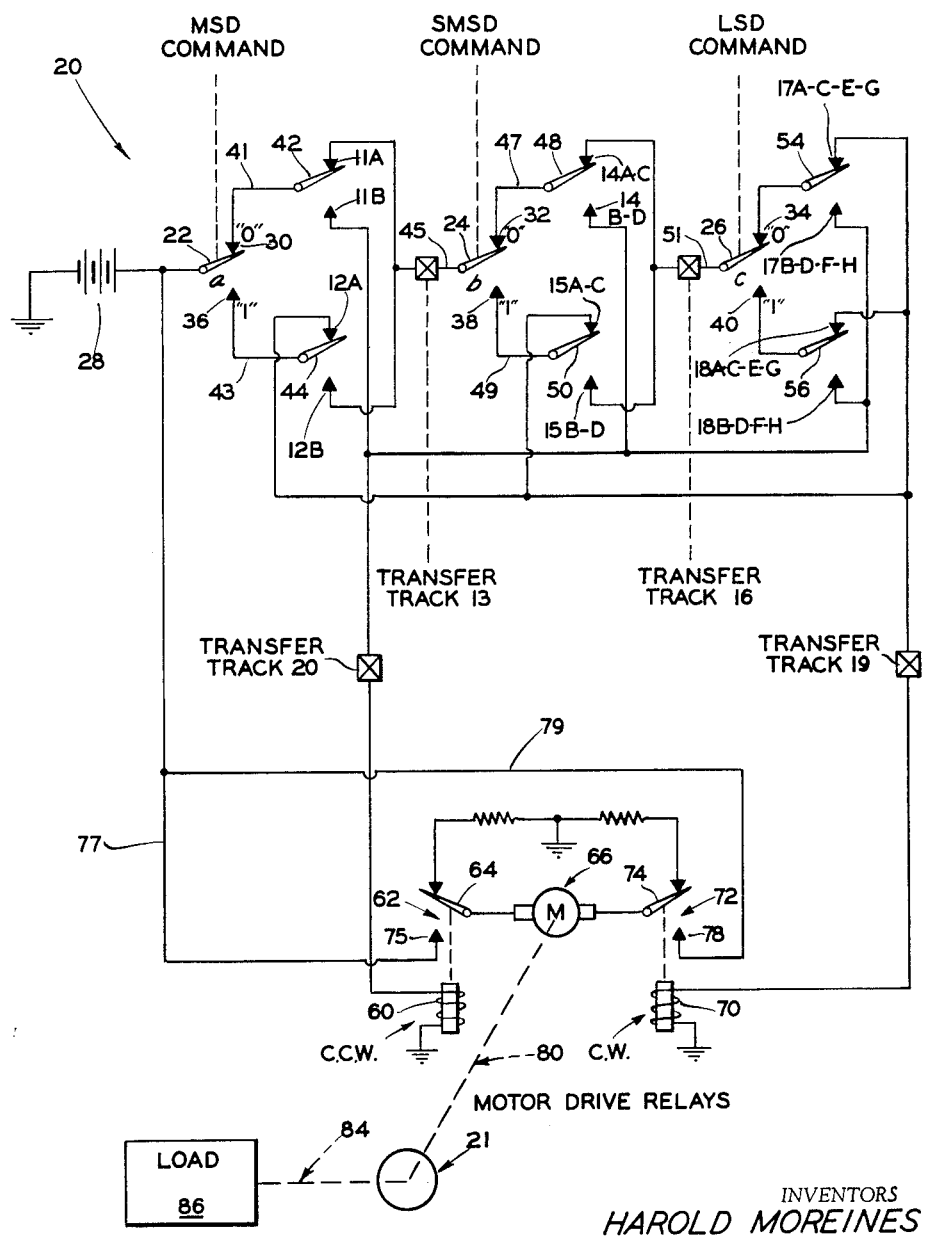
FIGURE 1 is a schematic diagram of a switching system embodying the invention ensuring interconnections between the digit command switches and the controlled servomechanism.
Figure 2:
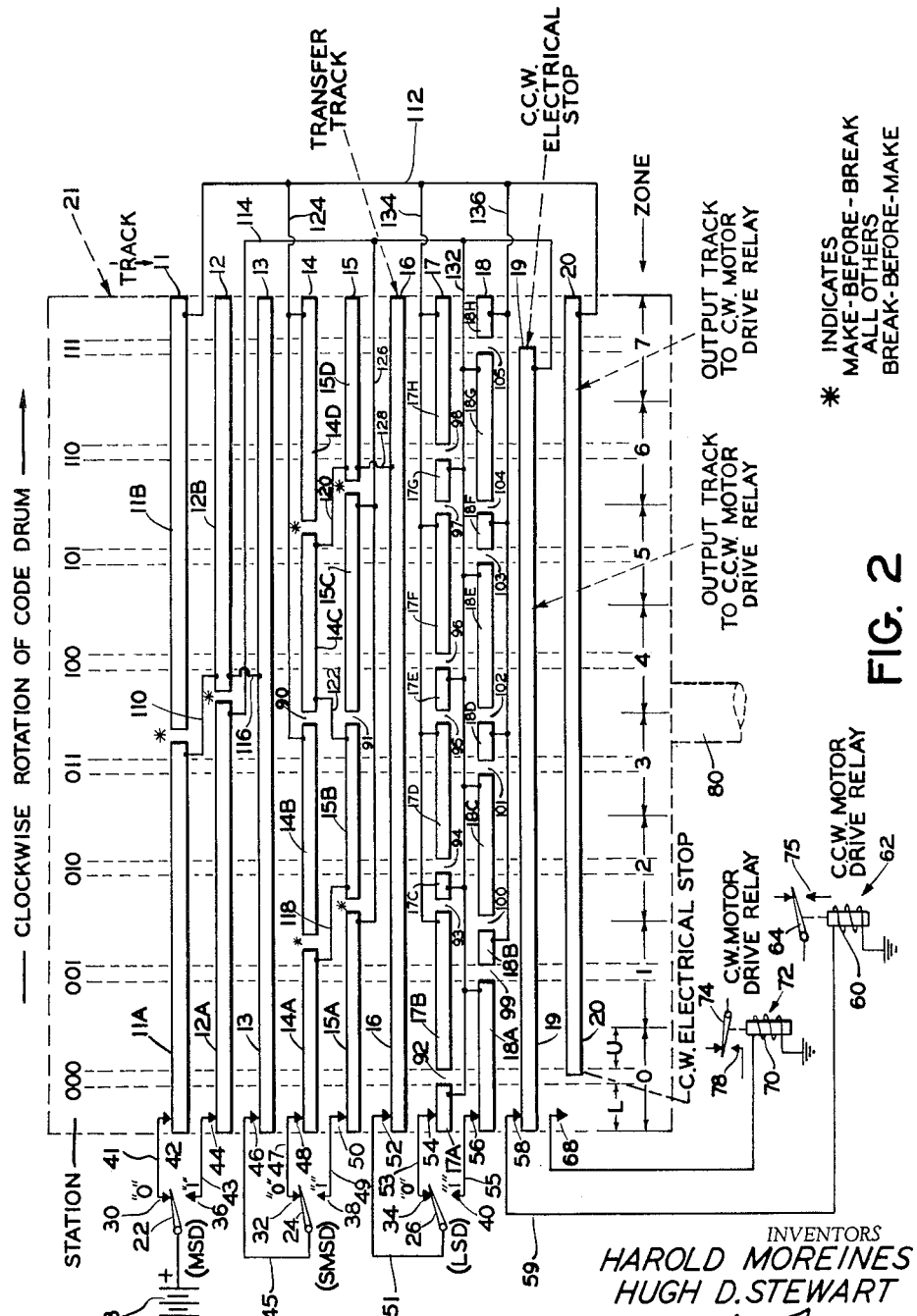
FIGURE 2 is a schematic developed view of the code drum information tracks.

Referring to the drawing of FIGURE 2, there are shown 10 basic information tracks indicated by the numerals 11–20 for effecting control of the three digit servomechanism indicated generally in FIGURE 1 by the numeral 20. The tracks are carried by a rotatable insulation drum 21.

It will be seen from the drawings of FIGURES 1 and 2 that there may be $3n+1$ tracks in an $n$-digit discrete servomotor mechanism such as shown therein.

In such arrangement, the most significant digit (MSD) command switch is indicated by the numeral 22 while the second most significant digit command (SMSD) switch is indicated by the numeral 24 and the least significant digit (LSD) command switch is indicated by the numeral 26. All of the command switches 22, 24, and 26 are shown in the so-called "0" command condition. The switch arm 22 is connected to a suitable source of electrical energy 28 and arranged to close a control contact 30 in the so-called "0" (MSD) command condition while the switch arm 24 is arranged to close a control contact 32 and the switch arm 26 is arranged to close a control contact 34.

Further, the switch arm 22 is arranged so as to be operated by an operator or remotely controlled relay to open the contact 30 and close a second contact 36 to select the most significant digit 1 while the switch arm 24 may be operated by the operator or by another remotely controlled relay so as to open the contact 32 and close a contact 38 to indicate the second most significant digit 1, and the switch arm 26 may be operated by the operator or another remotely controlled relay so as to open the contact 34 and close a contact 40 to indicate the least significant digit 1.

The switch contact 30 is connected by an electrical conductor 41 to a brush 42 arranged in cooperative relation to tracks 11A and 11B; switch contact 36 is connected by an electrical conductor 43 to a brush 44 arranged in cooperative relation to tracks 12A and 12B; switch arm 24 is electrically connected by a conductor 45 to a brush 46 arranged in cooperative relation with a transfer track 13; switch contact 32 is electrically connected by a conductor 47 to a brush 48 cooperatively arranged in relation to tracks 14A, 14B, 14C, and 14D. Switch contact 38 is electrically connected by a conductor 49 to brush 50 cooperatively arranged in relation to tracks 15A, 15B, 15C, and 15D; switch arm 26 is electrically connected by a conductor 51 to a brush 52 cooperatively arranged in relation to a transfer track 16; switch contact 34 is electrically connected by a conductor 53 to a brush 54 cooperatively arranged in relation to switch tracks 17A, 17B, 17C, 17D, 17E, 17F, 17G, and 17H; switch contact 40 is electrically connected by a conductor 55 to a brush 56 cooperatively arranged in relation to switch tracks 18A, 18B, 18C, 18D, 18E, 18F, 18G, and 18H.

Further, output track 19 has cooperatively arranged in relation thereto a brush 58 electrically connected by a conductor 59 to an electromagnetic winding 60 of a relay 62 controlling a relay switch arm 64 for in turn controlling the counterclockwise direction of rotation of a servomotor 66. Further, the output contact track 20 is arranged in cooperative relation to a brush 68 electrically connected to an electromagnetic winding 70 of a relay 72 controlling relay switch arm 74 for controlling the clockwise direction of rotation of the servomotor 66.

In the aforenoted arrangement, it is seen that upon energization of the relay 62, the switch 64 is biased downwardly so as to close a switch contact 75 operatively connected through a conductor 77 from a source of electrical energy 28 and so arranged that upon closure of the switch contact 75, the motor 66 is driven in a counterclockwise direction.

Similarly, closure of a switch contact 78 upon energization of the relay 72 connects a source of electrical energy 28 through a conductor 79 to effect energization of the servomotor 66 so as to drive the same in a clockwise direction. The servomotor 66, as shown in FIGURE 1, is operably connected through a shaft 80 to the novel code drum 21 and in turn through a shaft 84 to a load 86 to be adjustably positioned in multiple discrete positions (eight in the instant case) provided by the several tracks on the drum 21, as shown in greater detail in FIGURE 2.

In the arrangement of the several tracks provided on the novel drum 21, there has been indicated on the drawing of FIGURE 2 by an asterisk (\*) an operative relation between the adjacent tracks which is effective as the indicated brush travels over the same to cause the brush to make contact with the succeeding track before the brush breaks contact with the preceding track.

All other spaces between the respective tracks such as as 90, 91, 92, 93, 94, 95, 96, 97, 98, 99, 100, 101, 102, 103, 104, and 105 indicate a break before make relationship in the travel of the respective cooperating brushes therewith.

In an arrangement of the several contact tracks of FIGURE 2, the track 11A is connected by a conductor 110 to the track 12B while the track 11B is connected by a conductor 112 to the output conductor track 20. Further, the conductor track 12A is connected by a conductor 114 to the output conductor track 19. The track 12B is connected by a conductor 116 to a transfer track 13.

The conductor track 14A is connected by a conductor 118 to the conductor track 15B and the conductor track 14C is connected by a conductor 120 to a conductor track 15D and by conductor 122 to conductor track 15B. Further, the conductor tracks 14B and 14D are connected by a conductor 124 to the conductor 112 leading to a conductor track 20. The tracks 15A and 15C are connected by a conductor 126 to the conductor 114 and the conductor track 15D is connected by conductor 128 to the transfer track 16.

Further, in the aforenoted arrangement, the tracks 17A, 17C, 17E, 17G are connected by a conductor 132 to the conductor 114 leading to the output conductor track 19 while conductor tracks 17B, 17D, 17F, and 17H are connected by electrical conductor 134 to the conductor 112 leading to the output conductor track 20. Also, the conductor tracks 18B, 18D, 18F, and 18H are connected by a condutcor 136 to the conductor 112 leading to the output conductor track 20.

In the aforenoted arrangement, shown in FIGURE 2, it will be seen that the spaces between the several contact tracks indicated by the respective numerals 92, 99, 94, 101, 96, 103, 98, and 105 provide the eight discrete positions of the code drum 21 effecting the several stations for the digital commands 000, 001, 010, 011, 100, 101, 110, and 111.

The operation of the switch logic may be explained with reference to FIGURE 2 as follows:

The zones are arranged so that the numbers are traversed in sequence by counterclockwise rotation of the code drum 21 from the lowest, 000, to the highest, 111. The excitation voltage is applied through the most significant digit (MSD) command contact switch 22. All command contact switches 22, 24, and 26 are shown in the "0" command condition.

With the MSD command equal to "0," should the servo position be such that the MSD is not satisfied, contact will be made through track 11 to the clockwise motor drive relay 72 to provide torque. The torque will be in the proper direction to reduce servo position error between command and present position. Eventually, the servo position will reach zone 000 at which time the MSD command is satisfied.

Voltage is then transferred through the transfer switching track 13 to the second most significant digit (SMSD) command contact. This process is repeated for each significant digit.

However, when the least significant digit (LSD) command is satisfied, the servo may not be at its commanded station. It may lie in one of the guard zones adjoining the station within the commanded zone. In this situation, the proposed logic continues to provide for proper application of torque in the servomotor 66. Should the servo code drum 21 and cooperating control brush lie in the upper guard zone "U" (adjacent to the next higher numbered zone), the torque applied by the servomotor 66 will be clockwise. Should the position of the control brush lie in the lower guard zone "L" (adjacent to the next lower numbered zone), the torque will be counterclockwise. When the proper station position is achieved, the relay circuit is opened by either track 17 or 18.

Additional tracks 19 and 20 are required to provide a conductive path from the code drum 21 to each of the external clockwise and counterclockwise motor power relays 72 and 62.

It is seen from the foregoing that there has been provided novel control means automatically controlling the position of the servomechanism 20 with discrete position requirements in response to binary coded parallel digital command.

Furthermore, the switch logic disclosed herein provides a nonambiguous motor-torque so as to sequentially satisfy all input command digits starting with the most significant and ending with the least significant digit. Furthermore, the torque applied by the servomotor mechanism 66 will be applied in an uninterrupted manner and without reversal until the servomechanism is positioned at the proper station within the numbered zone commanded, as controlled by the code drum 21.

Furthermore, the switching logic effected by the aforenoted arrangement is such as to provide minimum slewing distance between stations, and a switch logic such as to minimize the number of information tracks required to accomplish the desired function thus contributing to improved system reliability.

Moreover, in such arrangement, the aforenoted motor torque is applied by the servomotor 66 when the servomechanism is not in the desired station, and the motor power is completely removed when the servo position is in the proper station thus providing positive positioning tolerances regardless of load friction.

Furthermore, in the aforenoted arrangement, the switching logic may be applied to a system of binary commands of arbitrary length (n digits), and the circuitry described herein is provided for illustrative purposes only and shall not be construed to limit the use of this logic to the particular 3-digit system described herein.

Moreover, in such arrangement, electrical stops are provided by suitably terminating track 19 at station 111 and track 20 at station 000 in a manner shown in FIGURE 2 so that energization of the servomotor 66 may be suitably limited at such points so as to prevent overtravel.

Although only one embodiment of the invention has been illustrated and described, various changes in the form and relative arrangement of the parts, which will now appear to those skilled in the art may be made without departing from the scope of the invention. Reference is, therefore, to be had to the appended claims for a definition of the limits of the invention.

What is claimed is:

1. A position control means for a movable object, said control means comprising in combination, a reversible motor, first means for controlling clockwise rotation of the motor, second means for controlling counterclockwise rotation of the motor, a drum rotatably positioned by the motor, a first pair of segmental conductor tracks carried by the drum, a first operator-operative switch, said first switch being selectively operable in one sense to effect energization of one of said first pair of segmental conductor tracks, said first switch being selectively operable in another sense to effect energization of another of said pair of segmental conductor tracks, a second pair of segmental conductor tracks carried by the drum, a second operator-operative switch, said second switch being selectively operable in one sense to effect energization of one of said second pair of segmental conductor tracks, said second switch being selectively operable in another sense to effect energization of another of said second pair of segmental conductor tracks, a third pair of segmental conductor tracks carried by the drum, a third operator-operative switch, said third switch being selectively operable in one sense to effect energization of one of said third pair of segmental conductor tracks, said third switch being selectively operable in another sense to effect energization of another of said third pair of segmental conductor tracks, means for electrically connecting a source of electrical energy to the first operator-operative switch, a first transfer track carried by the drum for electrically connecting at least one of the first pair of conductor tracks to the second operator-operative switch, a second transfer track carried by the drum for electrically connecting at least one of the second pair of segmental conductor tracks to the third operator-operative switch, a third pair of segmental conductor tracks carried by the drum and including in one of the segmental conductor tracks of said third pair a plurality of insulated portions, another segmental conductor track of said third pair of segmental conductor tracks including a plurality of other insulated portions, a first output conductor track carried by the drum and electrically connected to said first means for controlling clockwise rotation of the motor, a second output conductor track carried by the drum and electrically connected to the second means for controlling counterclockwise rotation of the motor, and an electrical network including brush means cooperating with said conductor tracks for interconnecting the first, second and third pairs of conductor tracks and said first, second, and third switches to said first and second output conductor tracks and therethrough selectively to said first and second control means, said brush means cooperating with the aforesaid insulated portions of said third pair of segmental conductor tracks in effecting selected positions of the movable object, the selected position of the movable object being effected by that one of the insulated portions of the third pair of segmental conductor tracks determined by the selected positions of the first, second, and third operator-operative switches.

2. A position control means for effecting eight discrete positions of a movable object, said control means comprising in combination, a reversible motor, first relay means for controlling clockwise rotation of the motor, second relay means for controlling counterclockwise rotation of the motor, a drum rotatably positioned by the motor, a first pair of segmental conductor tracks carried by the drum, a first operator-operative switch, said first switch being selectively operable in one sense to effect energization of one of said first pair of segmental conductor tracks, said first switch being selectively operable in another sense to effect energization of another of said pair of segmental conductor tracks, a second pair of segmental conductor tracks carried by the drum, a second operator-operative switch, said second switch being selectively operable in one sense to effect energization of one of said second pair of segmental conductor tracks, said second switch being selectively operable in another sense to effect energization of another of said second pair of segmental conductor tracks, a third pair of segmental conductor tracks carried by the drum, a third operator-operative switch, said third switch being selectively operable in one sense to effect energization of one of said third pair of segmental conductor tracks, said third switch being selectively operable in another sense to effect energization of another of said third pair of segmental conductor tracks, means for electrically connecting a source of electrical energy to the first operator-operative switch, a first transfer track carried by the drum for electrically connecting at least one of the first pair of conductor tracks to the second operator-operative switch, a second transfer track carried by the drum for electrically connecting at least one of the second pair of segmental conductor tracks to the third operator-operative switch, a third pair of segmental conductor tracks carried by the drum and including in one of the segmental conductor tracks of said third pair a plurality of insulated portions, another segmental conductor track of said third pair of segmental conductor tracks including a plurality of other insulated portions arranged in alternate relation to the insulated portions in the aforesaid one track of said third pair, a first output conductor track carried by the drum and electrically connected to said first relay means for controlling clockwise rotation of the motor, a second output conductor track carried by the drum and electrically connected to the second relay means for controlling counterclockwise rotation of the motor, and an electrical network including brush means cooperating with said conductor tracks for interconnecting the first, second, and third pairs of conductor tracks and said first, second and third switches to said first and second output conductor tracks and therethrough selectively to said first and second relay means, said brush means cooperating with the aforesaid insulated portions of said third pair of segmental conductor tracks in effecting selected positions of the movable object, the selected position of the movable object being effected by that one of said insulated portions of the third pair of segmental conductor tracks determined by the selected positions of the first, second, and third operator-operative switches corresponding to three binary digits to effect the eight discrete positions of the movable object, and said first output conductor track terminating at a point corresponding to the maximum permissible clockwise rotation of the motor and the second output conductor track terminating at a point corresponding to the maximum permissible counterclockwise rotation of the motor, and said first and second output conductor tracks cooperating with said brush means to operate said first and second relay means so as to effectively limit the clockwise and counterclockwise rotation of the motor and thereby prevent overtravel.

References Cited by the Examiner

UNITED STATES PATENTS

| | | |
|---|---|---|
| 2,676,289 | 4/54 | Wulfsberg et al. |
| 2,823,344 | 2/58 | Ragland. |
| 2,823,345 | 2/58 | Ragland et al. |
| 3,017,557 | 1/62 | Amato. |

JOHN F. COUCH, *Primary Examiner.*